Feb. 14, 1956 V. RAWLS 2,734,553
METHOD OF AND APPARATUS FOR REBUILDING PNEUMATIC TIRES
Filed April 5, 1954 6 Sheets-Sheet 6

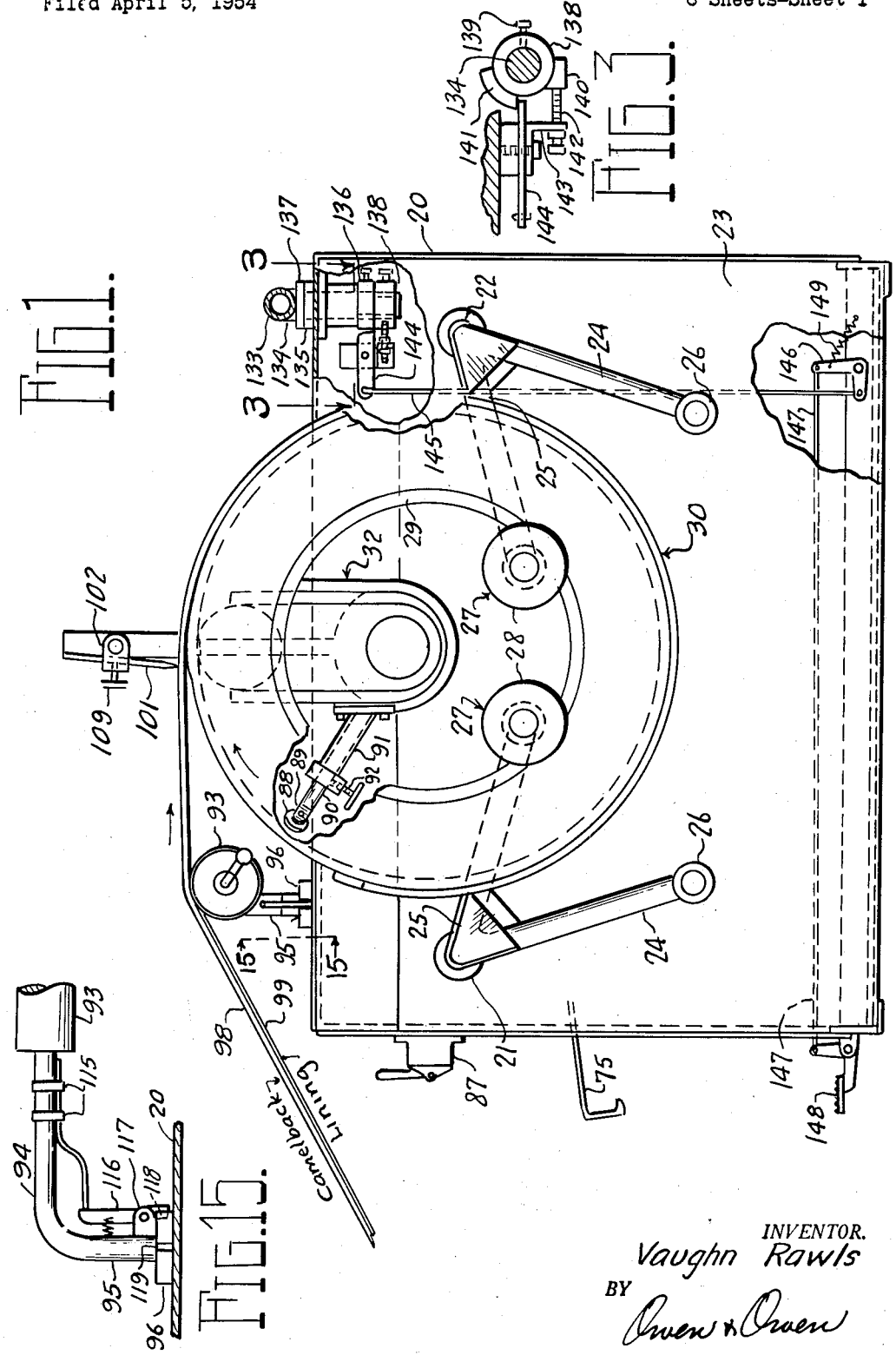

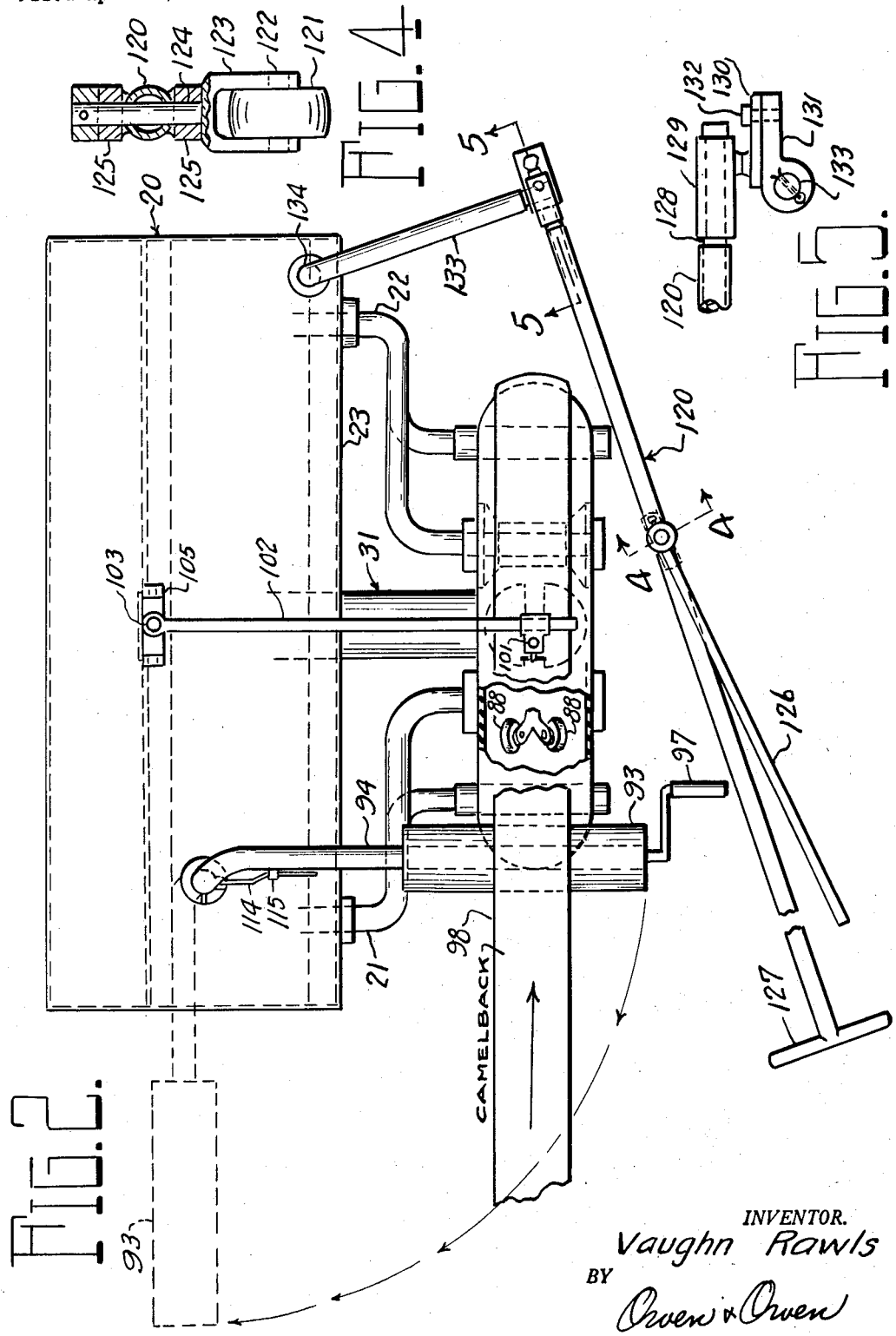

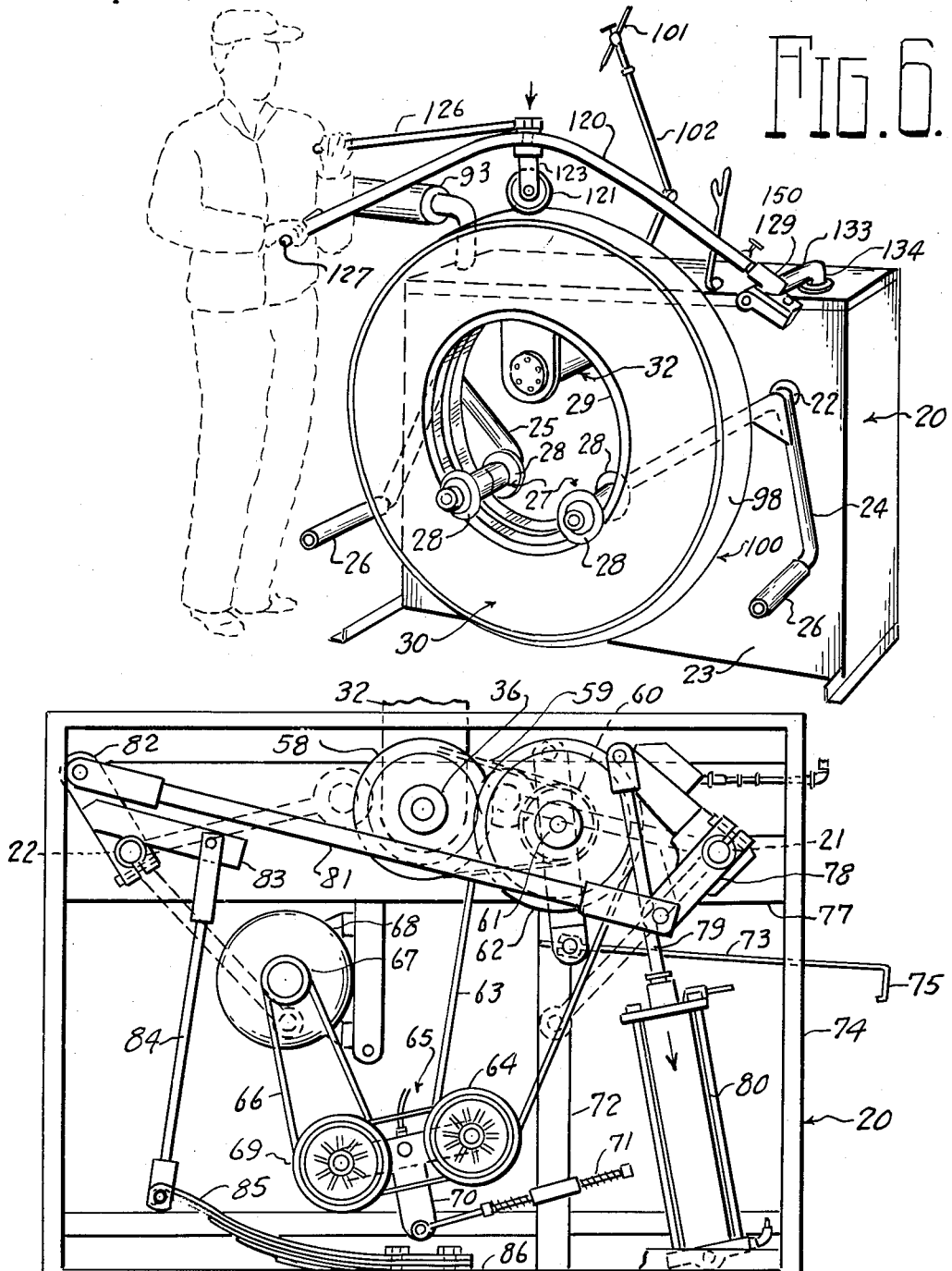

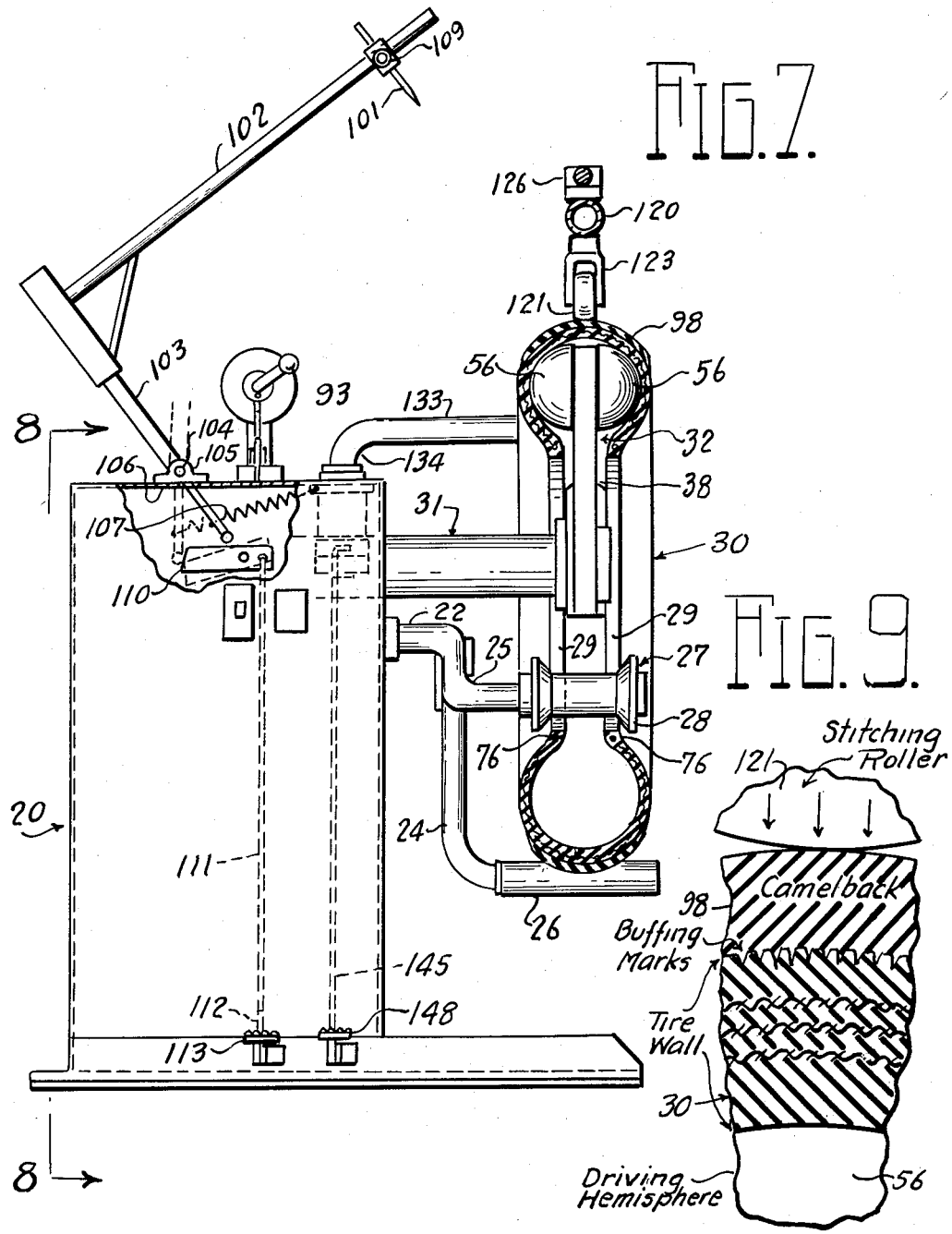

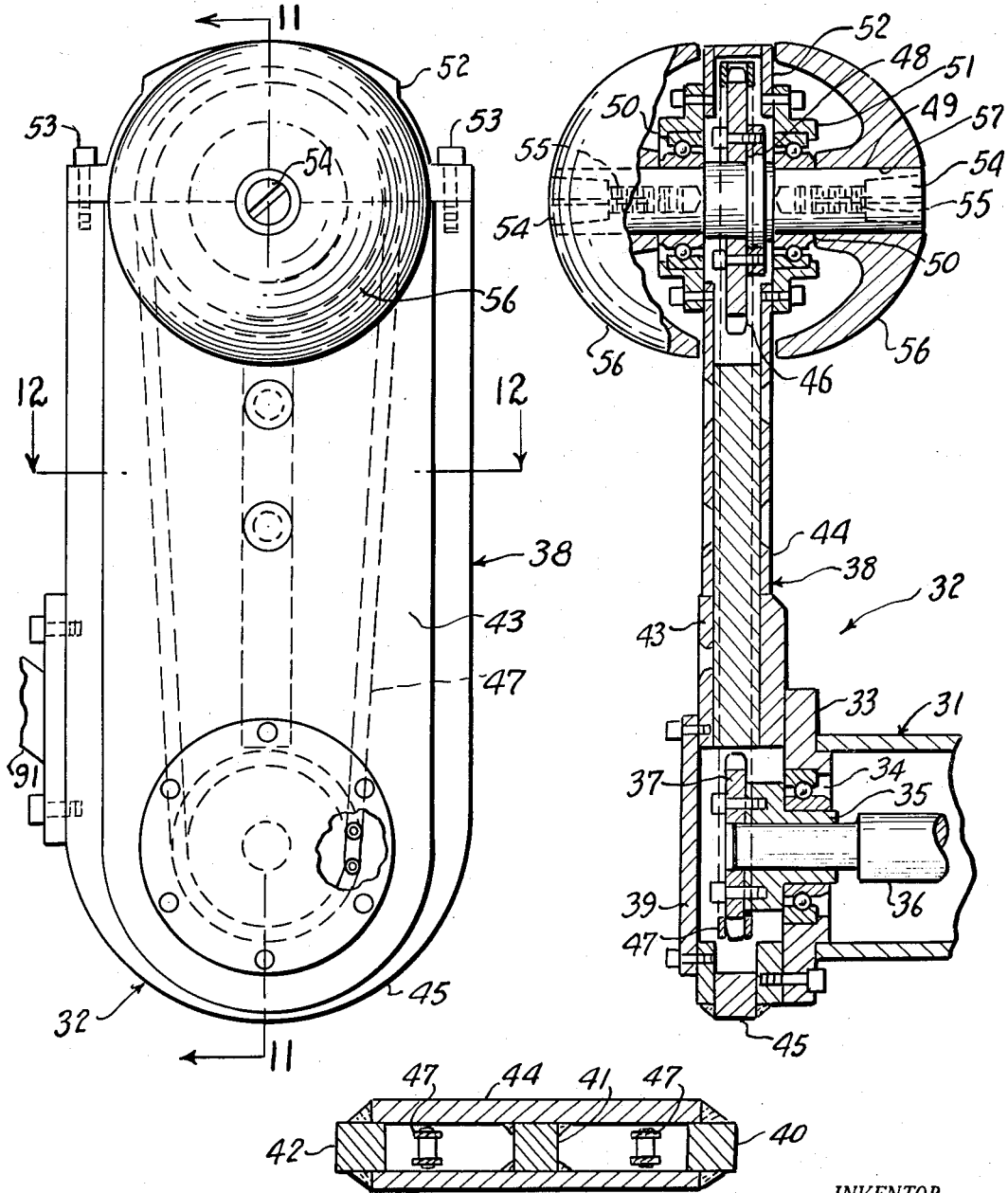

INVENTOR.
Vaughn Rawls
BY
Owen & Owen
ATTORNEYS

United States Patent Office 2,734,553
Patented Feb. 14, 1956

2,734,553

METHOD OF AND APPARATUS FOR REBUILDING PNEUMATIC TIRES

Vaughn Rawls, Lima, Ohio, assignor of thirty per cent to Robert W. LaWarre and ten per cent to Wesley O. Lones, Lima, Ohio Application April 5, 1954, Serial No. 420,775

23 Claims. (Cl. 154—9)

This invention relates to a method and to apparatus for rebuilding the tread surfaces of pneumatic tires.

The practice of "retreading" pneumatic tires, particularly heavy-duty, expensive tires, has become more widespread over the course of the years as the cost of material has increased and as progress in the formulation of materials suitable for use in retreading has resulted in improved wearability. In all retreading operations, however, it is essential that the new material, called "camelback" in the trade, and into which the tread design is molded during the vulcanizing process, should be adhered to the body or "carcass" of the tire very firmly so that it will not work loose as the tire flexes in use and thus will not be thrown off the tire during operation of the vehicle on which the tire is mounted.

Adhering the camelback to the peripheral surface of a tire carcass presents a number of difficulties. Foremost among them is the elimination of any pockets of air from between the surfaces of the camelback and the tire carcass. Any air which may be trapped between the surfaces will, of course, prevent adhesion of the two materials together and result in a weak finished structure. At the beginning of the retreading industry the camelback material was adhered to the surface of the tire carcass by hand "stitching," i. e., by running a pressure roller over the exterior surface of the camelback in order to squeeze it down tightly against the surface of the tire carcass and to work air out from beneath the camelback. Where larger numbers of tires are to be rebuilt, however, this method is both too time consuming and inefficient. This is particularly true in the case of large size tires where the weight is too great to enable an operator to be able to support or handle the tire easily. Furthermore, insufficient pressure and control are achievable in hand "stitching" to produce successful retreading.

Various machines have been developed for supporting and rotating the tire carcass to enable the camelback to be affixed. Some of these machines are provided with small wheels mounted on levers by which the operator can press against the exterior of the camelback to stitch it to the carcass. While partially successful, machines of the art have not entirely eliminated pockets of air nor have they eliminated the necessity for an operator to physically handle the heavy tires which are being retreaded.

It is the principal object of this invention to provide an apparatus and a method for retreading or rebuilding a tire carcass by the addition of a layer of unvulcanized rubber to its periphery which establishes conditions such that maximum adhesion between the tire carcass and the new material can be achieved and which virtually eliminates the possibility of air pockets remaining between the two materials.

It is another object of the invention to provide a machine for rebuilding tires which automatically mounts and dismounts the tires to be rebuilt.

Yet another object of the invention is to provide a method for adhering or stitching camelback to the exterior of a tire carcass which insures maximum adhesion between the materials and which permits an operator to shape the material as it is being adhered to provide the camelback material where it will be needed to construct the profile of the original or new tread to be molded.

It is another object of the invention to provide a method for opening up the roughened surface of a tire carcass and for forcing unvulcanized camelback material into the openings in the surface while excluding air from between the camelback and the carcass thereby achieving maximum adhesion between the materials to promote satisfactory vulcanization.

It is yet another object of this invention to provide an apparatus which comprises means for mounting the tire to be rebuilt in a manner providing for the accurate emplacement of the camelback on the tire carcass, which has stitching means by which an operator can insure a firm adhesion and is provided with means for opening up the conventionally roughened surface of the carcass so that the unvulcanized camelback material can actually be inserted into the small slits and cuts in the surface of the carcass.

A still further object of the invention is to provide a machine for rebuilding tire carcasses by the addition of the camelback thereto in which tires can be mounted and dismounted with a minimum effort on the part of the operator.

And yet another object of the invention is to provide a stitching machine through the use of which the camelback cannot only be very firmly adhered to the tire carcass but can also be thinned out or built up by shaping during stitching in order to provide material where it is needed on the tire surface to form the tread to be molded.

The foregoing objects will be better understood and more specific objects and advantages apparent from the specification which follows and from the drawings, in which:

Fig. 1 is a fragmentary view in elevation of apparatus embodying the invention.

Fig. 2 is a plan view of the apparatus shown in Fig. 1.

Fig. 3 is a fragmentary sectional view taken substantially on the line 3—3 of Fig. 1.

Fig. 4 is an enlarged fragmentary vertical sectional view taken along the line 4—4 of Fig. 2.

Fig. 5 is a fragmentary vertical sectional view taken along the line 5—5 of Fig. 2.

Fig. 6 is a simplified view in perspective illustrating the operation of apparatus embodying the invention according to the method of the invention for the stitching of camelback on a tire carcass.

Fig. 7 is an end view partly in section and partly in elevation taken from the left side of Fig. 1.

Fig. 8 is a fragmentary vertical elevational view taken from the rear of the apparatus, i. e., from the position generally indicated by the line 8—8 in Fig. 7.

Fig. 9 is a greatly enlarged fragmentary vertical sectional view through the wall of a carcass and showing the manner of adhesion or stitching of the camelback material thereto.

Fig. 10 is an enlarged view in elevation of driving mechanism employed in the machine illustrated, for rotating the tire being rebuilt.

Fig. 11 is a fragmentary vertical sectional view taken on the line 11—11 of Fig. 10.

Fig. 12 is a detailed horizontal sectional view taken along the line 12—12 of Fig. 10.

Fig. 15 is a fragmentary enlarged detailed view taken substantially on the line 15—15 of Fig. 1.

Figure 13:
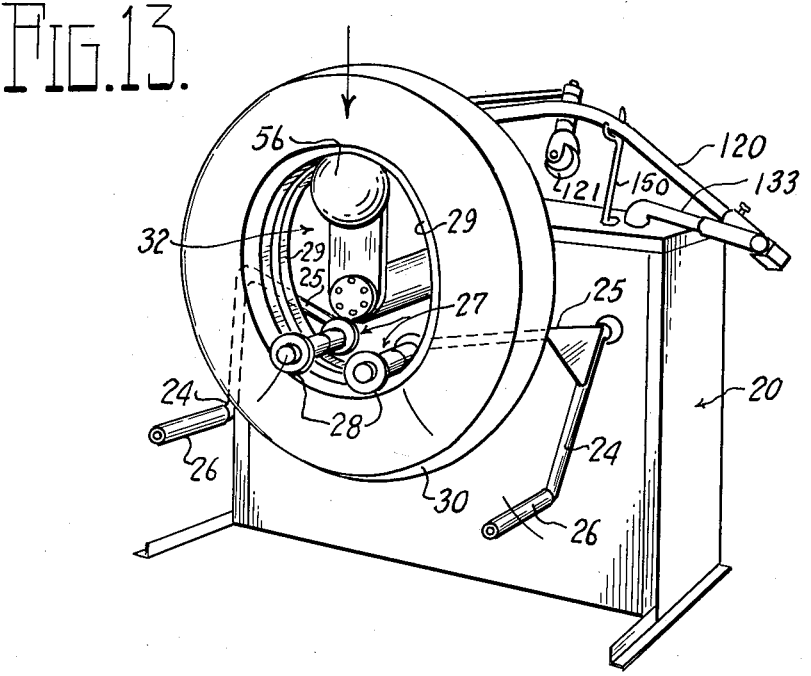
Fig. 13 is a view similar to Fig. 6 but illustrating the operation of a heavy tire on apparatus embodying the invention.

Apparatus embodying the invention comprises among other parts a main, generally rectangular housing indicated at 20 which encloses power mechanism for rotating a tire being rebuilt, for mounting and dismounting the tire and for expanding the surface of a tire being rebuilt in order to provide for maximum adhesion between camelback and tire carcass in accordance with the invention. A pair of horizontal shafts 21 and 22 protrude through a front wall 23 of the housing 20 and each carries two angularly spaced arms 24 and 25. The lower arms 24 are turned over horizontally at their ends and each mounts a roller 26 having a cylindrical surface. The two arms 25 are similarly turned over at their ends and each of the arms 25 mounts a flanged roller 27, the roller 27 being freely rotatable upon the arm 25. Each of the rollers 27 has two flanges 28 which are axially adjustable relative to each other and adapted to embrace the outsides of beads 29 of a tire generally indicated at 30 which is to be rebuilt.

A support arbor 31 also protrudes horizontally out of the wall 23 parallel to and centered between the shafts 21 and 22, at a slightly higher level. The arbor 31 has a dual function. It supports the weight of the tire 30 being rebuilt and it also encloses and carries mechanism for rotating the tire carcass 30. The driving mechanism supported by the arbor 31 is generally indicated at 32 and shown in detail in Figs. 10–12. As mentioned, the arbor 31 itself is a hollow, rigid tube extending horizontally out of the housing 20 and having a bearing plate 33 welded or otherwise rigidly connected to its outboard end. The bearing plate 33 mounts a bearing 34 which in turn rotatably supports a collar 35 that is keyed on the end of a horizontal drive shaft 36 extending co-axially through the arbor 31. The collar 35 carries a sprocket 37 which is enclosed in the lower end of a vertically extending casing 38. The sprocket 37 and collar 35 are accessible through a circular cover plate 39 removably mounted at the lower end of the casing 38.

The casing 38 comprises three spaced vertical bars 40, 41 and 42 and front and back plates 43 and 44 respectively. The five frame members 40–44, inclusive, may all be assembled by welding or similar means which render the structure rigid. The end bars 40 and 41 extend vertically throughout the length of the casing 44 and at their lower ends may be turned over horizontally in quarter circles to meet, forming a bottom 45 (Fig. 11) for the casing 38. The center bar 41 extends only part way through the casing 44, its lower end stopping above the sprocket 37 and its upper end being spaced below a similar sprocket 46 at the top of the casing 38. A drive chain 47 is meshed with the sprockets 37 and 46 with its spans extending vertically through the channels formed between the frame members of the casing 38 (Fig. 12).

The upper sprocket 46 is secured to a flange 48 integral with or fixed upon a two ended stub shaft 49 that is rotatably journaled in a pair of spaced bearings 50, the bearings 50 being supported in turn in bearing cups 51 that are bolted to the upper ends of the plates 43 and 44 at the bottom and to an arcuate cover 52 at the top. The arcuate cover 52 closes the top of the casing 38 and is secured by bolts 53 to the upper ends of the vertical bars 40 and 42.

Rotation of the shaft 36 by mechanism to be described below, produces rotation of the shaft 49 through the medium of the sprockets 37 and 40 and chain 47. Each end of the shaft 49 is split longitudinally along perpendicular planes and a coned locking screw 54 is inserted in a threaded axial bore 55 in each end of the shaft 49. By turning the screws 54 further into their sockets the split ends of the shaft 49 may be radially expanded and similarly by unthreading the screws 54 the resiliency of the shaft material causes its outer diameter to decrease.

A pair of driving hemispheres 56 are removably mounted upon the shaft 49, one at each side. Each of the hemispheres 56 has a polar bore 57 of such diameter as to slide over the stub shaft 49 when its expansion screw 54 is threaded out of the corresponding bore 55. Each pair of hemispheres 56 is of such diameter as to be adapted to fit in the torus shaped interior of a tire carcass (as can best be seen in Fig. 7). Each of the sets of hemispheres 56 will, of course, function for several sizes of tires as, for example, tires having a nominal diameter of 6", 6.25" and 6.50". Another set of hemispheres 56 might be provided for tires having diameters of between 6.75" and 7.25". Other larger and smaller sets of hemispheres would be employed with tires of larger and smaller diameters.

The shaft 36 extends through the arbor 31 into the interior of the housing 20 and on its inner end (Fig. 8) carries a pulley 58. The inner end of the shaft 36 is, of course, suitably journalled in bearings (not shown in Fig. 8). A belt 59 is engaged in the pulley 58 and in a pulley 60 pinned or keyed to a jackshaft 61 which also supports a larger diameter pulley 62. The pulley 62 is engaged with a belt 63 which also is engaged in a telescoping sheave 64 of a variable speed mechanism generally indicated at 65. A driving belt 66 is engaged between a pulley 67 on a motor 68 and second telescoping sheave 69 of the variable speed mechanism 65. The variable speed mechanism 65 as a unit is mounted upon a rocking arm 70 connected by a spring balanced link 71 to a main control lever 72 in turn connected to a generally horizontally slidable control bar 73 which protrudes through an end wall 74 of the housing 20 and terminates in a handle 75. Rocking the variable speed transmission 65 changes the driving ratio between the sheaves 64 and 69 to change the ultimate speed of the shaft 36, this being under the control of the operator through the medium of the control handle 75.

It has been found in tire rebuilding practice that good adhesion in the unvulcanized state between the camelback and the tire carcass cannot be achieved unless the surface of the tire carcass is roughened. This operation is denominated as "buffing." The buffing operation not only prepares the surface of the tire for adhesion of the camelback thereto but it also serves to remove unnecessary old material and, if properly carried out, to restore the tire carcass to its proper profile upon which the tread is to be rebuilt. Buffing is performed by grinding away the unnecessary material on the exterior of the tire carcass and the removal is best accomplished by the application to the tire carcass of a rapidly rotating wheel, the periphery of which comprises a plurality of sharp points, conventionally the points of protruding carpet tacks. Of course, similar sharp points such as staggered saw teeth or other protrusions might be equally effective. The buffing operation literally tears away the exterior surface of the tire carcass and lacerates the surface with a multiplicity of relatively fine cuts.

Operation according to the invention contemplates not only that the camelback will be adhered to the exterior of the tire but it also provides for the actual pentration of the camelback material in its unvulcanized condition into the slits and cuts in the surface of the tire carcass. To provide for this penetration which takes place at the time of the "stitching" of the camelback to be described below, the apparatus disclosed includes means for stretching the material from which the peripheral surface of the tire carcass is made. This stretching means comprises the flanged rollers 27 mounted on the ends of the arms 25 of the shafts 22 and mechanism shown in Fig. 8 for applying power to the shafts 22 for swinging the arms 25 downwardly and outwardly. Since the flanged rollers 27 are engaged with the beads 29 of the tire 30, this downward and outward pressure pulls the tire body 30 as a whole downwardly stretching it over the hemispheres 56 and actually producing a pronounced bulge in the tire 30 where it engages the hemispheres 56. Since the beads 29 of all tires are relatively unstretchable due frequently to the presence of heavy steel reinforcing wires 76 (Fig. 7) therein, the beads 29 do not stretch. Stretching the tire carcass over the hemispheres 56 opens up the buffing marks as illustrated in Fig. 9 so that the camelback material can penetrate thereinto.

The power for swinging the arms 25 and flanged rollers 27 to pull the tire 30 down over the hemispheres 56 is provided by mechanism illustrated in Fig. 8. Each of the shaft 21 and 22 is suitably journalled in bearings supported by a heavy cross member 77 of the housing 20. A bell crank 78 is secured on the inner end of the shaft 21, one of its arms being pivotally connected to a plunger rod 79 of a suitable air or hydraulic cylinder 80. The other arm of the bell crank 78 is linked by a rigid pull rod 81 to a crank arm 82 that is fixed on the inner end of the shaft 22. A secondary arm 83 is welded to or integral with the arm 82 and connected by a rod 84 to a return spring 85 that is rigidly fixed on a base member 86 of the housing 20.

Energization of the cylinder 80 to pull its rod 79 downwardly swings the bell crank 78 in a counterclockwise direction (Fig. 8) rotating the shaft 21 in a clockwise direction (Fig. 1) to swing its arm 25 downwardly. Simultaneously the pull rod 81 swings the crank arm 82 in a clockwise direction (Fig. 8) rotating the shaft 22 and its arm 25 in a counterclockwise direction (Fig. 1).

With the tire 30 mounted upon the apparatus, i. e., in the position illustrated in Figs. 1, 2, 6 and 7, the downward pressure of the flanged rollers 27 stretches the tire body over the hemispheres 56 and also provides frictional contact between the hemispheres 56 and the interior of the tire 30 to insure that rotation of the hemispheres 56 produces rotation of the tire 30. More or less air pressure may be required in the cylinder 80 to stretch larger or smaller tires as necessary, the amount of pressue being controlled by the operator through the medium of a suitably connected valve 87 (Fig. 1).

In order to insure that the tire 30 "runs true" on the hemispheres 56 and to assist the flanged wheels 27 in maintaining it in this position during operation, a pair of guide rollers 88 (Fig. 1) are mounted upon two diverging arms 89 (see also Fig. 2) fixed on the end of an inclined sliding bar 90 inserted in a support tube 91 which is bolted to and carried by the casing 38 (Fig. 10). A locking screw 92 (Fig. 1) locks the bar 90 in place in the support tube 91 and provides for adjustment of the position of the guide rollers 88 to accommodate tires of different major diameters.

Assuming now that the tire 30 is mounted in place on the machine with the arms 25 and flanged rollers 27 swung downwardly to stretch the tire over the hemispheres 56, the first step in the rebuilding operation consists in applying the unvulcanized camelback to the carcass. Camelback material comes in ribbon-like form of different widths and thicknesses depending upon the size of the tire being rebuilt. The unvulcanized camelback material, say one-half inch thick, has a pressure sensitive adhesive coated on its undersurface and the pressure sensitive adhesive coating is protected during shipment and until use by a fabric referred to as a camelback lining. This fabric strip must be peeled off the camelback before the pressure sensitive adhesive is exposed. The lining also serves the purpose of keeping the undersurface of the camelback clean to insure its effective adhesion to the exterior of the tire carcass. A machine embodying the invention includes a camelback removal roller 93 (Figs. 1, 2, 6 and 7) which is rotatably and slidably mounted upon a horizontal arm 94 the end of which is turned over forming a vertical strut 95 for the roller 93. The strut 95 is rotatable in a bushing 96 mounted on top of the housing 20 to permit the roller 93 to be swung from its camelback feeding position shown in solid lines in Figs. 1 and 2 to its inactive position shown in broken lines in Fig. 2. The roller 93 has a hand crank 97 on its outer end.

When camelback, indicated at 98 in Figs. 1 and 2, is to be fed onto the exterior of a tire 30 it is led upwardly and over the surface of the roller 93, its lining 99 being manually stripped for a short distance and wrapped by the operator around the roller 93. As the camelback 98 is fed onto the tire 30 (its free end being adhered by the pressure sensitive adhesive and it being pulled by rotation of the tire 30) the operator turns the crank 97 at a proper speed to wind up the camelback lining stripping it off the camelback 98 as the camelback 98 moves in the direction of the arrow in Fig. 1. When a sufficient amount of camelback has been fed onto the exterior of the tire 30 to completely cover its perimeter, the operator stops the rotation of the tire 30 and cuts the camelback with a sharp instrument so that the two ends of the strip of camelback on the tire are butt jointed as at 100 in Fig. 6. The operator then can back up the camelback 98 slightly, unwinding enough lining from the roller 93 to cover the length of camelback 98 extending between the roller 93 and its severed end, and then cut the camelback lining 99 with the sharp instrument. The camelback 98 and lining 99 in the supply strip may then be returned to their source.

In order to guide the operator during initial emplacement of the camelback 98 on the tire 30, a center index 101 is adjustably positioned on the end of an arm 102 extending out horizontally over the tire 30. The index 101 and arm 102 are shown in guiding position in Figs. 1 and 2 and in inactive position in Figs. 6 and 7. The arm 102 is supported on the upper end of a tilting arm 103 which is provided with a pair of horizontal pivot pins 104 that are pivoted in ears 105 mounted on the top of the housing 20. The arm 103 extends downwardly through a small opening 106 (Fig. 7) in the top of the housing 20 and its lower end is connected to a coil spring tensioned to swing the lower end of the arm 103 toward the tire 30 and thus the upper end of the arm 103 and the arm 102 and index 101 upwardly and to the left as shown in Fig. 7. A stop pin 108 limits the movement of the arm 103 into the inoperative position.

The guide 101 is adjustable both longitudinally of the arm 102 and vertically thereof, being locked in position by a locking screw 109 with its lower end centered on the tire 30 so that the operator may employ it as a guide in laying the camelback 98 onto the tire 30.

The position of the guide 101 is controlled by a guide latch 110 (Fig. 7) linked by a rod 111 to a crank 112 and by a longitudinally extending rod (not shown) to a foot pedal 113 at the operator's end of the machine. By depressing the foot pedal 113 the latch 110 can be dropped allowing the spring 107 to contract, to swing the index 101 into the position shown in Fig. 7. When the operator wishes to restore the index 101 to its indicating position he can manually grasp the arm 102 swinging it downwardly and displacing the latch 110 which then snaps up behind the lower end of the arm 103.

Movement of the camelback lining roller 93 from its wind up position shown in solid lines in Figs. 1 and 2 to its inactive position shown in broken lines in Fig. 2 (solid line, Fig. 7) is accomplished by the operator sliding the roller 93 on its arm 94 until the end of the roller 93 strikes the end of a latch actuating pin 114 (Fig. 15) that is slidingly mounted in a pair of guides 115 on the arm 94. The other end of the pin 114 engages the upper end of a spring pressed latch 116 which is pivoted in ears 117 and the lower end of which is engageable in either of a pair of vertical notches 118 or 119 that are milled in the periphery of the collar 96. By sliding the roller 93 to position against the pin 114, the latch 116 is disengaged and the arm 94 may be swung around horizontally from the solid line position of Fig. 2 to the broken line position of Fig. 2. This removes the roller 93 from its obstructing position over the tire 30 just as the index 101 is removed from its operating position by the action of its spring 107 when the pedal 113 is depressed.

By operation of the various mechanisms so far described in the manner so far described, the tire 30 has been stretched and slowly rotated and a length of camelback 98 has been fed onto its periphery, the lining being wound up upon the roller 93 and the camelback being centered by the operator's reference to the guide index 101. The tire 30 and camelback 98 are now in condition to be stitched together.

The operation of stitching the camelback onto the buffed tire carcass consists in pressing the camelback material tightly onto the tire. Preferably the pressure applied exteriorly of the camelback should be applied from the median plane of the tire outwardly toward the sides of the camelback so as to exude all of the air from between the surfaces of the camelback and the tire carcass.

In the apparatus of the invention, pressure for stitching the camelback onto the tire carcass is provided manually through the medium of a stitcher arm 120 (Figs. 2 and 6) on which a rotary stitching wheel 121 is mounted for movement in a variety of directions in a manner to be described below. The stitching wheel 121 (Fig. 4) is rotatably journalled on a pin axle 122 which is mounted in the bifurcations of a yoke 123. The yoke 123 is secured on the lower end of a vertically extending pin 124 which is mounted for rotation on a vertical axis by a pair of pads 125 welded or otherwise secured to the top and bottom of the arm 120. A hand lever 126 (Figs. 2 and 6) is pinned or otherwise secured to the upper end of the pin 124.

The arm 120 is arcuate in general configuration so that it extends upwardly over the perimeter of the tire 30 being stitched, terminating at its free end in a cross handle 127 by which an operator can maneuver the arm 120. The rear end of the arm 120 is swiveled on a stub shaft 128 (Fig. 5) which protrudes generally horizontally forward from a socket 129. The socket 129 is rigidly fixed on the upper surface of an upper swivel plate 130 which is pivotally connected to a lower swivel plate 131 by a bolt 132. The lower swivel plate 131 is rockably mounted on the free end of an arm 133 (Figs. 2 and 6) which, like the arm 94 extends horizontally away from a vertical strut 134 (Figs. 1 and 6). The vertical strut 134 extends downwardly through the top of the casing 20 being rotatably carried by a collar 135 therein.

At the lower end of the strut 134 a positioning collar 136 is secured thereto to prevent the strut 134 from being moved upwardly out of the collar 135 and a bearing flange 137 is welded to the strut 134 just above the collar 135 to limit its downward movement. A stop collar 138 is pinned to the lowermost end of the strut 134 by a locking screw 139 (see Fig. 3). The stop collar 138 has a pair of radially protruding stops 140 and 141. The stop 140 cooperates with an adjustable stop pin 142 that is threaded in a stop bracket 143 secured to the inner frame of the casing 20 and the positioning stop 141 cooperates with a movable latch 144 which is pivotally mounted in the stop bracket 143. The free end of the latch 144 (Fig. 1) is linked to a pull rod 145 which extends downwardly and is in turn connected to a bell crank 146 and through the crank 146 to a forwardly extending pull rod 147 which leads to a foot pedal 148 protruding from the operator's side of the machine adjacent the foot pedal 113 (Fig. 7). A spring 149 is connected to the bell crank 146 to urge it in clockwise direction holding the latch 144 in position to engage the positioning stop 141.

Figure 14:
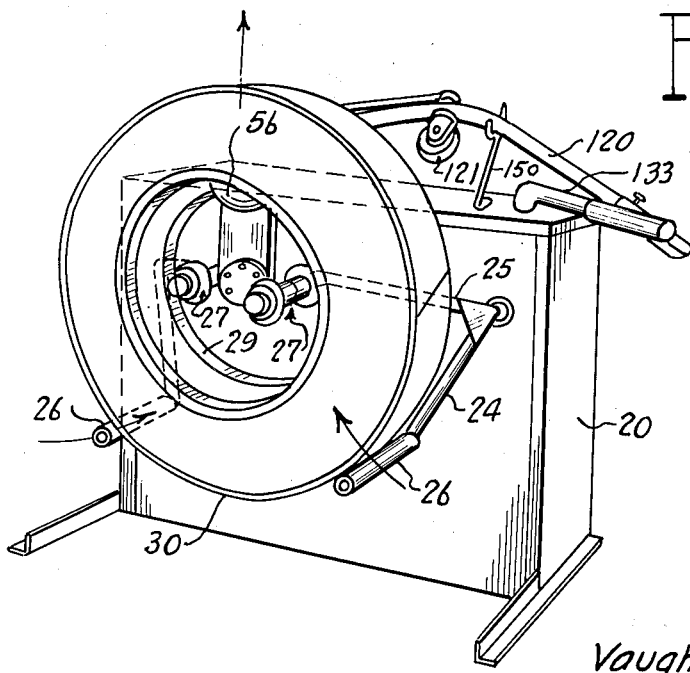
Fig. 14 is a view similar to Fig. 13 but illustrating the operation of dismounting a rebuilt tire from apparatus embodying the invention.

When the operator depresses the foot pedal 148 the latch 144 is swung out of engagement with the positioning stop 141 and then the operator can swing the arm 133 and stitching arm 120 in a counterclockwise direction (Figs. 2 and 3) to move the stitching arm 120 and its support arm 133 to a rest position shown in Figs. 13 and 14. In this position of the stitcher arm 120 and support arm 133, the stitcher arm 120 may be placed in a rest formed by the bifurcated upper end of a support bracket 150. The stitcher arm is placed in the rest position during the previously described operations of mounting and emplacing camelback on the exterior of the tire being rebuilt.

After the operator has adhered the camelback to the exterior of the tire in the manner described above, he depresses the foot pedal 148 releasing the latch 144 and he then lifts the stitcher arm 120 from its support 150 and pulls the arm 120 bodily toward himself into the position illustrated in Fig. 6. This swings the arm 133 in a clockwise direction (Figs. 2 and 3) until the stop 140 engages the stop pin 142. The operator then releases the foot pedal 148 dropping the latch 144 behind the arcuate positioning stub 141 and locking the arm 133 in the position illustrated in Fig. 6. The operator then grasps the handle 127 in one hand and the end of the lever 126 in the other hand and properly adjusts the handle 75 to set the speed of the variable speed transmission 65 and consequently the speed of rotation of the driving hemispheres 56 and the tire 30.

It will be observed, particularly in Fig. 7, that when the arm 133 is swung to its stitching position, the center line of the stitching arm 120 extends forwardly in the vertical median plane of the tire being stitched.

The operator then presses downwardly on the handle 127 engaging the stitching wheel 121 with the exterior generally central portion of the layer of camelback 98 on the exterior of the tire. Downward pressure on the stitching roller 121 squeezes the camelback 98 against the surface of the tire 30, transferring the force downwardly through the camelback 98 and the tire 30 to the driving hemispheres 56 which are supported by the casing 38 and arbor 31. The downward pressure of the stitching roller 121 squeezes the camelback 98 tightly against the tire 30 not only exuding the air from between their surfaces but also squeezing or extruding the soft, unvulcanized, camelback into the sharp buffing marks left in the surface of the tire during the buffing operation earlier referred to (Fig. 9). None of the pressure applied to the camelback by the operator through the medium of the stitching arm 120 is absorbed by the camelback or the tire 30 except by the squeezing of the camelback into the buffing slits but it is all resisted by the structure which supports and drives the hemispheres 56.

In order to stitch the lateral portions of the camelback 98 to the arcuate peripheral surface of the tire carcass 30 the operator swings the handle 127 to one side or the other and since the stitching arm 120 is mounted upon swivels on three perpendicular axes (Fig. 5), it is free to swing over as the operator carries the handle 127 around an arcuate path to move the roller 121 laterally toward the side of the tire 30. As the tire continues to rotate the stitching roller 121 thus stitches another circumferentially extending section of the camelback 98 progressively across the camelback 98 gradually forcing the air out from between the surfaces toward the edge of the camelback 98.

Since the stitching roller 121 is mounted on the lower end of a vertical swivel pin the position of its axis relative to the stitching arm 120 can be changed. By swinging the lever 126 relative to the stitching arm 120, the operator can tilt the axis of the stitching roller 121 progressively as the stitching arm 120 is swung farther and farther around the side of the tire being rebuilt keeping the axes of the stitching roller 21 in planes parallel to the plane of the tire 30 being rebuilt. By tilting the axis of the handle 127 to a greater or lesser degree the soft, unvulcanized camelback 98 can be stretched around the edge of the tire and can be molded over the shoulder of the tire and gradually thinned out as it approaches the shoulder crest of the tire, or it can be carried around the corner at its standard thickness or even built up as the edge is approached. The soft, unvulcanized rubber material of which the camelback is made can be "spun" over in a manner similar to spinning metal over a mandrel so that its thickness across the tire is under the control of the operator. By properly adjusting the position of the axis of the stitching roller 121 the operator can stretch or shorten the distance which the camelback extends.

After the camelback 98 is stitched on one side of the median plane the operator swings the arm 120 back to its vertical position and then starts stitching down the other side of the camelback 98, similarly stretching or compressing the camelback material laterally to provide an appropriate profile.

It is to be remembered of course that the operator need not profile the camelback layer with extreme precision because it will be subsequently placed in a tire tread mold and vulcanized under heat and pressure so as to extrude the camelback material into the tread mold. The operator need only place the camelback material 98 on the tire carcass 30 in its approximate location so that it will properly flow and fill the spaces within the tire mold.

Upon the completion of the stitching operation it is found that all of the air between the surface of the camelback 98 and the tire 30 has been squeezed out laterally. The camelback 98 is extruded into a substantial proportion of all of the slits and small crevices in the tire 30 resulting from the buffing operation. The pressure sensitive adhesive present on the back of the unvulcanized camelback material adheres the camelback 98 to the tire carcass 30 with great tenacity.

After the completion of the stitching operation the operator depresses the pedal 148 and swings the stitching arm 120 back and over to its rest position on the support bracket 150 (Figs. 13 and 14). The operator then moves the tire 30 from the machine and the stitching operation is completed. The tire with its stitched external layer of camelback is then placed in an appropriate tread mold and the vulcanization carried on.

In the description so far the operations of mounting and dismounting a tire from the machine illustrated have been only generally referred to. Where the tire is of small size and weight, for example, a passenger tire in the order of 6.00 x 15", an operator quite easily can lift the tire into place, manually separating the beads 29 sufficiently to permit the tire to be dropped over the driving hemispheres 56. On the other hand, where a large, heavy tire such as a heavy truck tire, or an off-the-road tire such as a tractor tire or an earth hauler tire, is to be rebuilt, the weight of the tire is so great that an operator cannot handle it sufficiently well so as to force it down over the hemispheres 56. Similarly the material of the tire is so tough that an operator cannot manually spring its beads 29 sufficiently to have them drop over the hemispheres 56.

In order to mount a tire of this type the operator actuates the air cylinder 80 to swing the arms 24 and 25 to their upper position, i. e., with the support rollers 26 raised above the position shown in any of the drawings. This places the support rollers 26 at a level of a few feet above the floor and the operator can swing the tire upwardly lifting it enough so that he can move it sideways to drop it upon the support rollers 26 with its central opening extending around and above the driving mechanism 32. At this time the tire 30 is in position slightly elevated with respect to the machine from that position illustrated in Fig. 13. The rollers 26 extend beneath and are in supporting contact with the exterior of the tire. The inner beads 29 of the tire do not contact the hemispheres 56.

The operator then energizes the mechanism for rotating the hemispheres 56 and actuates the power cylinder 80 to pull downwardly on the pairs of arms 24 and 25. This swings the arms 25 downwardly and outwardly lowering the tire with the support rollers 26 until the flanged rollers 27 engage the beads 29 of the tire and grasp the tire between their flanges 28. At this point the tire 30 and the apparatus are in the position illustrated in Fig. 13. Continued downward movement of the tire 30 is brought about by the swinging movement of the arms 25 and forces the edges of the beads against the upper surfaces of the two hemispheres 56. Since the hemispheres 56 are rotating, this starts to produce rotation of the tire 30 now supported on the hemispheres 56. Continuing downward pressure and rotation of the tire squeezes the beads 29 downwardly on the hemispheres 56 and gradually separates them so that continued downward movement of the tire forces the tire down and over the hemispheres 56, mounting the tire on the machine as illustrated in Fig. 1, for example.

The stitching operation which has been previously described in detail is then carried through and completed.

When it is desired to remove such a heavy tire from apparatus of the invention, the actuation of the power cylinder 80 is reversed. The arms 24 and 25 are swung upwardly until the lower support rollers 26 engage the outside of the tire 30. The tire is simultaneously being rotated by frictional contact with the driving hemispheres 56. Upward movement produced by the pressure being exerted on the support rollers 26 gradually lifts the tire 30 to separate its beads 29 around the driving hemispheres 56 until the tire 30 is lifted to a point such that the hemispheres 56 are removed from between the beads 29. Fig. 14 illustrates the position of the apparatus parts and the tire 30 just as the tire 30 reaches a position sufficiently high so that the hemispheres 56 become visible beneath the beads 29. Completion of the removal of the tire of course results in the tire being above the position indicated in Fig. 15 or in Fig. 13 sufficiently high with respect to the power mechanism 32 that the tire can be tilted laterally while supported on the rollers 26 or, if too heavy to lift, toppled off the support rollers 26 onto the floor.

I claim:

1. A method for stitching tread material to the exterior of a pneumatic tire casing comprising the steps of preparing the peripheral surface of the carcass of the tire for adhering tread building material thereto, stretching the material of the surface of the carcass and pressing tread building material tightly against the stretched surface of the carcass.

2. A method for stitching tread material to the exterior of a pneumatic tire casing comprising the steps of preparing the peripheral surface of the carcass of the tire for adhering tread building material thereto, stretching the material of the surface of the carcass in two directions and pressing tread building material tightly against the stretched area of the surface of the carcass.

3. A method for stitching tread material to the exterior of a pneumatic tire casing comprising the steps of buffing the area of said casing on which the material is to be stitched to a desired configuration, stretching an area of the surface of said casing and forcing tread material tightly against the stretched area of such surface.

4. A method for stitching tread material to the peripheral surface of a tire carcass comprising cutting a plurality of small slits in the surface thereof, opening the slits in the surface of a small area thereof progressively around the perimeter of the tire carcass and simultaneously tightly pressing tread building material against such area of the surface and into such opened slits.

5. A method for stitching tread material to the exterior of a pneumatic tire casing comprising the steps of buffing the area of said casing on which such material is to be stitched to a desired configuration and cutting a plurality of slits in the surface thereof, stretching the surface to open such slits and forcing tread material tightly against such surface and into such slits.

6. A method for stitching tread material to the exterior of a pneumatic tire casing comprising the steps of buffing the area of said casing on which such material is to be stitched to a desired configuration and cutting a plurality of slits in the surface thereof, inserting a support structure having a circular cross section of diameter less than the inner diameter of the body of said tire into the body of said tire, pulling said tire radially away from said support for stretching the surface of said tire and opening such slits and forcing tread material radially against such surface and into said slits.

7. A method for stitching tread material to the exterior of a pneumatic tire casing comprising the steps of buffing the area of said casing on which such material is to be stitched to a desired configuration and cutting a plurality of slits in the surface thereof, inserting a support structure having a circular cross section of diameter less than the inner diameter of the body of said tire into the body of said tire, engaging the rim bead of said tire at at least one point remote from the area of engagement of the support structure with roller means and moving said roller means radially away from the support structure to stretch the surface of the tire over and around the support for opening such slits, and forcing tread material radially against such surface and into said slits.

8. Apparatus for rebuilding tires comprising means for mounting said tire for rotation on its major axis, means for stretching areas of the peripheral surface of said tire progressively around the perimeter of said tire and means for tightly pressing tread building material against the stretched area of such surface while such area is stretched.

9. Apparatus for rebuilding tires comprising cooperating roller means, one of said means being adapted to be inserted inside the annular space within said tire and the other of said means being positionable on the outside of said tire in line with the first said means, means for applying pressure to bring said rollers together for squeezing the material of the carcass of said tire and tread building material together between the surfaces of said rollers, means for driving one of said rollers for producing rotation of said tire and the tread building material around the major axis of said tire and means for concomitantly stretching the material of said tire over the surface of the first one of said roller means while said material is located between said roller means.

10. Apparatus for rebuilding tires comprising roller means for mounting and rotating said tire on its major axis including a power driven member over which said tire is placed and contacting at least an area of the inside of the peripheral portion of said tire, means for stretching said tire over said member and means for tightly pressing tread rebuilding material against the outside surface of said tire and said tire against said member.

11. Apparatus for rebuilding tires comprising roller means for mounting and rotating said tire on its major axis including a power driven member over which said tire is placed and contacting at least an area of the inside of the peripheral portion of said tire, at least one auxiliary roller mounted for contacting the rim bead of said tire and for movement generally radially of said tire for stretching the peripheral surfaces of said tire over said member and a stitching wheel movably generally radially of said tire for pressing tread building material against the outside peripheral surface of said tire and the inside of said tire against said member at the stretched area of the surface of said tire.

12. Apparatus for rebuilding tires comprising roller means for mounting and rotating said tire on its major axis including a power driven member over which said tire is placed and contacting at least an area of the inside of the peripheral portion of said tire, at least one rim bead engaging roller mounted for movement along an arc extending generally radially of said tire and engageable with the rim bead of said tire for stretching an area of the peripheral surface of said tire over said member, a secondary auxiliary roller spaced from and movable with said rim bead engaging roller and adapted to engage the exterior of said tire for supporting said tire and for lifting said tire off said power driven member and a stitching wheel movably generally radially of said tire for pressing tread building material against the outside peripheral surface of said tire and the inside of said tire against said member at the stretched area of the surface of said tire.

13. Apparatus for rebuilding tires comprising roller means for mounting and rotating said tire on its major axis including a power driven member over which said tire is placed and contacting at least an area of the inside of the peripheral portion of said tire, a pair of rim bead engaging rollers mounted on axes parallel to the axis of said tire at points spaced from the location of said driven member, said rollers being each movable through an arc extending generally radially of said tire, the arcs of movement thereof diverging away from said driven member, whereby movement of said rollers along such arcs, when engaged with the rim bead of said tire, pulls said tire tightly over said driven member and stretches an area of the peripheral surface of said tire thereover, and a stretching wheel movably generally radially of said tire for pressing tread building material against the outside peripheral surface of said tire and the inside of said tire against said member at the stretched area of the surface of said tire.

14. Apparatus for rebuilding tires comprising, in combination, a driving member adapted to be inserted interiorly of the annular space within a tire casing into engagement with the inner side of the tread surface of said casing, said member being rotatable for frictionally rotating said tire on its major axis, frame means for rigidly supporting said driving member and a tire mounted thereon, drive means for rotating said driving member, at least one auxiliary roller engageable with the inner edges of the rim beads of said tire, and a stitching roller mounted above said driving member and engageable with the exterior of a layer of tread building material on the exterior of said tire for pressing said material onto said tire along a line of force radial to said driving member.

15. Apparatus according to claim 14 in which said auxiliary roller is mounted for rotation on an axis parallel to the axis of said driving member and said roller is translatable along a path generally radial to the axis of said tire for movement into and out of engagement with the beads of said tire.

16. Apparatus according to claim 14 in which said auxiliary roller is rotatably supported on an arm for translation and power means for swinging said arm into engagement with the rim bead of said tire and for pulling said tire away from said driving means for stretching the surface of said tire over said driving means.

17. Apparatus according to claim 16 and a second auxiliary roller rotatably mounted for movement with but spaced from the first said auxiliary roller a distance sufficient to space said auxiliary rollers on the inside and outside respectively of the annular body of a tire to be rebuilt.

18. Apparatus for rebuilding tires comprising, in combination, a frame; a horizontally extending support arm; a drive casing rigidly mounted on the free end of said arm and extending upwardly therefrom; a horizontal spindle rotatably mounted at the upper end of said casing and having its opposite ends free; a pair of drive hemispheres removably mounted on the free ends of said spindle and forming a generally spherical drive member of diameter less than the inside diameter of the annular section of a tire to be rebuilt; two rim bead contacting rollers; a pair of arms for mounting said rollers on axes parallel to the axis of said spindle and for movement along arcs extending generally radially to a tire mounted on said drive member that diverge therefrom; power means for swinging said arms to move said rollers into contact with the bead of the tire and for pulling the tire over said drive sphere for stretching the peripheral surface of the tire in the area contacting said drive sphere; a stitching wheel; a stitching wheel arm universally pivotally mounted at a point lying in the median plane of said tire when said tire is positioned over said drive sphere and extending up and over the perimeter of said tire, said stitching wheel being pivotally carried by said arm at a point located generally exteriorly of said drive sphere; and means for guiding a length of tread building material onto said tire as a peripheral layer on the exterior thereof.

19. Apparatus according to claim 18 and a secondary roller carried by each of said roller arms on an axis parallel to and spaced from the axis of the associated bead contacting roller a distance sufficient for positioning of said rim bead contacting rollers and said secondary rollers on the inside and outside, respectively, of the annular section of the tire, said power means being adapted to swing said secondary rollers into engagement with the exterior of said tire for forcing said tire off of said drive sphere.

20. Apparatus for performing a reconditioning treatment on the outer peripheral tread surface of a pneumatic tire comprising means for mounting said tire for rotation on its major axis, means for stretching areas of the peripheral surface of said tire progressively around the perimeter of said tire as said tire is rotated, an arm extending over said tire when mounted on said mounting means and rotary means mounted on and movable by said arm generally radially into contacting position with the perimeter of said tire at such stretched area.

21. Apparatus for performing a tire rebuilding operation on the tread surface of a tire casing, said apparatus comprising a driving member adapted to be inserted interiorly of the annular space within a tire casing into engagement with the inner side of the tread surface of said casing, said driving member having a dimension axially of said tire greater than the space between the rim beads of said casing and being rotatable for frictionally rotating said tire on its major axes, frame means for rigidly supporting said driving member, said frame means extending between the rim beads of said casing when said casing is mounted on said driving member, at least one auxiliary roller engageable with the inner edges of the rim beads of said casing, means for mounting said auxiliary roller for rotation on an axis parallel to the axis of said tire and means for translating said roller along a path generally radial to said casing into engagement with the rim beads of said casing and for pulling said casing over said driving member.

22. Apparatus according to claim 21 in which said auxiliary roller is rotatably supported on an arm for translation and power means for swinging said arm into engagement with the rim bead of said casing and for pulling said casing over said driving member.

23. Apparatus according to claim 22 including a second auxiliary roller rotatably mounted for rotation on an axis parallel to the axes of said tire and the first said auxiliary roller and spaced therefrom a distance sufficient to place said auxiliary rollers on the inside and outside respectively of the annular body of a tire casing and means for translating the second said auxiliary roller in a return direction for engaging the second said auxiliary roller with the exterior of the tread surface of said tire casing for removing said casing off of said driving member.

References Cited in the file of this patent

UNITED STATES PATENTS

| | | |
|---|---|---|
| 1,747,533 | Sessions | Feb. 18, 1930 |
| 2,473,067 | Miller | June 14, 1949 |
| 2,474,511 | Bacon | June 28, 1949 |
| 2,498,953 | Glynn | Feb. 28, 1950 |
| 2,504,090 | Sanderson | Apr. 11, 1950 |
| 2,556,264 | Flynn | June 12, 1951 |
| 2,717,022 | Duerksen | Sept. 6, 1955 |